July 18, 1933.    J. V. KINDL    1,918,758
GAS VALVE
Filed July 29, 1932

Inventor
JOSEPH V. KINDL

Patented July 18, 1933

1,918,758

UNITED STATES PATENT OFFICE

JOSEPH V. KINDL, OF CLEVELAND, OHIO, ASSIGNOR TO THE W. J. SCHOENBERGER COMPANY, OF CLEVELAND, OHIO, A CORPORATION OF OHIO

GAS VALVE

Application filed July 29, 1932. Serial No. 625,571.

My invention relates in general to improvements in gas valves of the cock-valve type and with respect to its more specific features to self-locking gas valves of the push and pull type such as described in my co-pending application Serial No. 545,698 which valves prevent accidental and negligent operation with consequent danger to life and property from escaping gas. These gas valves ordinarily embody a spring pressed cone-shaped cock, housed in a cone-shaped valve chamber and yieldingly pressed upon its seat, for tightly engaging the walls of said chamber and for permitting easy and proper assembly and access to the cock in repairing and reseating operations. The seating spring for the cock of these valves also actuates the automatic locking means for the cock, such as a locking washer which engages with parts of the valve body or its cover member when the valve is rotated to predetermined position and which prevents further actuation of the cock unless the locking means are disengaged from their locking position. Difficulty has been encountered in the use of valves of the kind referred to due to the fact that the valve stem which slidably and non rotatably interlocks with the cock when the valve is interlocked is not effectively supported. Thus the spring acts upon the valve stem of these valves only when the valve is in locked position, and permits of free unrestricted shifting movement thereof, when the valve is in unlocked position.

To overcome this disadvantage it has been proposed to use two springs, one for actuating the locking means and a second one for seating the cock of the valve, but such arrangement is complicated and consequently expensive to manufacture and assemble.

The primary object of the present invention is to provide a valve of the character specified with stop and locking means for locking the cock of the valve against rotation and for yieldingly forcing the valve stem axially into proper position by a single spring, which spring resiliently seats the cock of the valve and by co-operation with specifically devised locking means actuates said locking means and shifts the valve stem back to normal from any valve position, either locked or unlocked.

Another object of the invention is the provision of a valve of the type described with a cock having a hollow extension for seating and guiding a single spring therein, which extension cooperates with the locking means and valve stem during actuation and locking of the valve.

Still another object of the invention is the provision of a valve of the type described wherein shiftable locking means serve to limit the rotation of the cock and automatically lock said cock in closed position, and in which shifting of such means is necessary before the cock may be rotated to its open position.

With the foregoing and other objects in view, the invention consists essentially in the matters hereinafter set forth and more particularly described in the present specification and illustrated in the accompanying drawing:

In the drawing, in which like characters of reference indicate corresponding parts in each figure:

Figures 1 through 11 show the various parts of the valve. Thus, Figure 1 is a side elevation of the handle and Figures 2 and 3 are side and bottom elevations of the cover member for securing the valve stem to the valve body. Figure 4 is a side elevation of the operating stem and Figure 5 is a bottom elevation of said stem. Figures 6 and 7 are side and bottom elevations of the lock washer. Figure 8 is a side elevation of the spring seating the valve and lock washer. Figures 9 and 10 are side elevations of the rotatable valve or cock member and Figure 11 is a top elevation of said cock member.

Figure 12 is a longitudinal sectional view through an assembled opened two way valve embodying the features of the invention;

Figure 13 is a sectional view taken on line 13—13 of Figure 12; and

Figure 14 is a sectional view taken on line 14—14 of Figure 12, the cock being shown in closed or locked position.

In the exemplified form of the invention shown in the drawing the U-shaped cast metal body 2 of the two-way valve is centrally cored or chambered, as at 3 to provide a cone shaped seat 4 for a plug valve or cock member 5 rotatably mounted therein. The branches 6 and 7 of body 2 communicate with chamber 3 through drilled passages 8, 9, 10 and 11 respectively, and the outer ends of such branches are externally screw-threaded for standard connection with gas pipes not shown. Body 2 includes a hollow laterally extending branch or nipple 12, arranged in a plane substantially at right angles to the plane of branches 6 and 7, which nipple is externally threaded at its outer end for convenient attachment to the manifold 14 of a range or gas stove, not shown. Nipple 12 communicates through passage 15 with valve chamber 3, passage 15 being located in the plane of passages 10 and 11 for communication therewith. A milled slot 16 in plug valve 5 may alternately be brought into alignment with passages 10, 11 and 15, by rotating the plug.

The two way valve thus described has two open positions and a neutral position in which latter position the gas supply is entirely shut off. In operation plug valve 5 is manually rotated by means of a valve stem 17 having its lower end extending into and interengaging with a hollow extension 19 formed on the top of plug 5, the stem being provided with an operating handle 20 rigidly attached thereto by screw 21. Hollow extension 19 is formed with a circular recess 22 centrally therein and two oppositely arranged slots 23, 24 of different width extending through the circumferential wall 25 above said recess to permit finger portions 26, 27 integrally formed on the lower end of valve stem 17 to slidably and non-rotatably interengage said stem with plug 5 when said stem is partly entered within extension 19. Finger portions 26 and 27 are proportioned to fit slots 23 and 24 and are of different width to insure proper assembly of these parts.

A flanged apertured cap or cover member 28 seated upon the extended neck 29 of body 2 closes the open top of said body and centers valve stem 17 with respect to body 2 and plug 5. The valve stem extends through a centrally arranged flanged opening 30 in said cover member and thence into said body as shown in Figures 12 and 14. A flange 31 depending from cover member 28 is formed with oppositely extending apertured ears 32 which seat upon laterally extending apertured lugs 33 on body 2 in spaced relation to the end face thereof and are rigidly connected therewith by screws 34. One side of 31 is cut away at one side to form a narrow recess 34' and at the opposite side is formed with an arcuate depending portion or extension 35, which extends around approximately one fourth of the periphery of the flange and seats against the end face of body 2. The opposite ends of the portion 35 thus form stop shoulders which limit the rotation of plug valve 5, when the elongated arm 36 of a lock washer or plate 37, is slidably but non-rotatably seated within hollow extension 19 and in engagement with slots 23, 24. When the arm 36 of plate 37 is forced into the narrow recess 34' by means of a compression spring 38 also seated within and guided by the hollow extension 19 of plug 5 and tending to force said plate upwardly against the cover member 28, the valve will be positively locked. It will be noted that lock washer or plate 37 is formed with a centrally disposed bulged out portion 40 co-pending with a recess 41 in the bottom face of valve stem 17 to insure proper alignment of these parts in locked position of the valve or plug 5.

As previously stated, when valve plug 5 is seated to close supply passage 15 from communication with passages 8 and 9, lock washer 37 yieldingly engages in narrow recess 34' of cover member 28, see Figure 14. To release the extension or arm 36 of the washer stem 17 is pushed inwardly until said arm is entirely pushed out of recess 34', and a slight turning movement is imparted to the stem 17, during which movement the arm 36 of said washer or plate seats upon and rides over the lower edge of flange 31 of the cover member 28. In this position the short arm 42 of lock washer 37 rests against finger portion 26 of valve stem 17, and being yieldingly forced upwardly also pushes stem 17 upwardly until its finger portions 26 and 27 contact with the inner face of cover member 28. When washer 37 is tilted by pressing on the valve stem 17, the latter together with the valve 5 may be freely rotated to make the desired connection. Turning of stem 17 and valve 5 in opposite directions to neutral position brings extension 36 of washer or plate 37 into alignment with recess 34', so that spring 38 will force the extension into said recess and thus prevent further rotation of the valve. Consequently it will be seen that it is impossible to rotate the valve beyond its neutral position unless the valve stem is axially shifted.

The arcuate portion or extension 35 depending from cap 28, is preferably indented or corrugated at or close to its stop shoulders as at 44 for stiffening said extension and also to insure proper functioning of the stop shoulders.

The locking mechanism illustrated herein may be readily applied to one way valves for locking same against rotation when in off position or for valves embodying a similar position.

Having thus described my invention, what I claim is:

1. A valve comprising a valve body having a valve seat and a hollow extension aligned with said seat, a valve having a slotted hollow extension rotatably confined within said seat, a shaft slidably and non-rotatably interengaged with said extension of said valve, locking means slidably, tiltably, and non-rotatably inter-engaged with said extension of said valve for locking said shaft and valve against rotation, cover means non-rotatably attached to said hollow extension of said body, a cut out portion in said cover means co-operating with said locking means in locking operations, and yielding means within said hollow extension and guided thereby for forcing said locking means and said shaft continuously toward said cover means away from said valve, said locking means being disengageable by axial shifting of said shaft.

2. A valve comprising a valve body having a valve seat and a hollow extension aligned with said seat, centrally apertured cover means non-rotatably attached to said extension, a valve in said valve body having a slotted hollow extension, a shaft extending through said cover means inserted into said slotted extension, finger portions on said shaft slidably and non-rotatably interengaged with said slotted extension, a spring pressed locking means slidably and tiltably confined within said slotted extension abutting against the bottom face of said finger portions, said locking means and said cover member having co-operating means for locking said shaft and valve when in predetermined positions.

3. A valve comprising a valve body, a flanged cover means non-rotatably attached to said body, a recess in the flange of said cover means, a valve in said valve body having a slotted hollow extension, a shaft for said valve slidably and non-rotatably interengaged with the extension thereof, a locking plate slidably and tiltably guided in said extension and a compression spring within said extension for forcing said valve upon its seat and said stem and locking means away from said valve, said locking plate including oppositely arranged extensions, one of said extensions for interlocking with said recess of said cover member and the other for forcing said stem in unlocked position away from said valve in contact with the inner wall of said cover member.

4. A valve comprising a valve body, a flanged cover means non-rotatably attached to said body, a recess in the flange of said cover means, a valve in said valve body having a hollow extension, diametrically opposed slots of different width in the circumferential wall of the hollow extension of said valve, a shaft for said valve having finger portions of different width at its lower end fitting the slots in the wall of said hollow extension for engagement with said slots when said shaft is partly inserted into said valve extension, a locking plate having oppositely arranged extensions equal in width to the extensions of said shaft for slidable tiltable and non-rotatable support of said plate in said extension and assembly of said valve, shaft and locking plate in one position only and a compression spring within said extension for forcing said valve upon its seat and said locking plate away from said valve and shifting said shaft outwardly when in locked and unlocked position, to effect locking of said valve plug and shaft with a snap action of said plate.

5. A valve comprising a valve body, a rotatable valve plug within said body, a shaft for operating said valve plug slidably and non-rotatably interlocked therewith, spring pressed, tiltable locking means arranged in axial alignment with said shaft and slidably tiltably and non-rotatably interlocked with said valve plug opposite said shaft, and means cooperating with said locking means for automatically locking said valve and shaft against rotation, said locking means being tiltable when in unlocked position to effect outward shifting of said shaft by said locking means when said valve plug is unlocked, and locking of said valve plug and shaft with a snap action when said locking means is shifted from tilted position to a straight position.

6. A valve comprising a valve body, a passaged valve plug confined within said valve body, a cap attached to said valve body, a shaft extended through said cap slidably and non-rotatably interlocked with said valve plug, spring pressed means within said body and cap yieldingly shiftable and tiltable with respect thereto for yieldingly forcing said shaft continuously outwardly and locking said plug and shaft against rotation and stopping rotation of said plug and shaft when the plug is in fully opened position, and means on said cap cooperating with said locking and stopping means during locking and stopping operations.

JOSEPH V. KINDL.